US010994593B2

(12) United States Patent
Okazaki et al.

(10) Patent No.: US 10,994,593 B2
(45) Date of Patent: May 4, 2021

(54) MOUNTING STRUCTURE FOR DOORFRAME MOLDING

(71) Applicants: AISIN SEIKI KABUSHIKI KAISHA, Kariya (JP); TOYOTA JIDOSHA KABUSHIKI KAISHA, Toyota (JP)

(72) Inventors: Hiroshi Okazaki, Nagoya (JP); Naoki Tsutsumi, Nagakute (JP); Ryuta Yamasaki, Toyota (JP)

(73) Assignees: Aisin Seiki Kabushiki Kaisha, Kariya (JP); Toyota Jidosha Kabushiki Kaisha, Toyota (JP)

( * ) Notice: Subject to any disclaimer, the term of this patent is extended or adjusted under 35 U.S.C. 154(b) by 346 days.

(21) Appl. No.: 15/875,184

(22) Filed: Jan. 19, 2018

(65) Prior Publication Data

US 2018/0208037 A1    Jul. 26, 2018

(30) Foreign Application Priority Data

Jan. 26, 2017    (JP) .............................. JP2017-012091

(51) Int. Cl.
| | |
|---|---|
| *B60J 10/86* | (2016.01) |
| *E06B 7/23* | (2006.01) |
| *B60J 10/76* | (2016.01) |
| *B60J 10/36* | (2016.01) |
| *B60J 5/04* | (2006.01) |
| *B60J 10/88* | (2016.01) |

(52) U.S. Cl.
CPC ............. *B60J 10/86* (2016.02); *B60J 5/0402* (2013.01); *B60J 10/36* (2016.02); *B60J 10/76* (2016.02); *B60J 10/88* (2016.02); *E06B 7/2301* (2013.01)

(58) Field of Classification Search
CPC ... B60J 10/86; B60J 10/88; B60J 10/36; B60J 10/76; B60J 5/0402
See application file for complete search history.

(56) References Cited

U.S. PATENT DOCUMENTS

| | | | | |
|---|---|---|---|---|
| 5,548,929 | A * | 8/1996 | Larsen ..................... | B60J 10/22 24/297 |
| 9,096,114 | B2 * | 8/2015 | Baratin .................... | B60J 10/80 |
| 9,616,734 | B2 * | 4/2017 | Clark ....................... | B60J 10/30 |
| 9,809,097 | B1 * | 11/2017 | Metcalf .................... | B60J 10/27 |
| 2006/0125285 | A1 | 6/2006 | Mizukoshi et al. | |

(Continued)

FOREIGN PATENT DOCUMENTS

| | | |
|---|---|---|
| JP | 2006-105290 | 4/2006 |
| JP | 2007-62399 | 3/2007 |
| JP | 2011-131788 | 7/2011 |

*Primary Examiner* — Gregory J Strimbu
(74) *Attorney, Agent, or Firm* — Finnegan, Henderson, Farabow, Garrett & Dunner, LLP

(57) ABSTRACT

A mounting structure for a doorframe molding includes an upper edge part that defines an upper side of a window frame of a vehicle door. The mounting structure further includes an engaging part that includes a shaft part and a rib part extending from a lower end of the shaft part in a vehicle front-rear direction or a vehicle width direction, a body part of the doorframe molding, and a bracket that projects from the body part and is engaged with the engaging part. The bracket has a cut-out part that is made by cutting out the bracket. The shaft part is inserted into the cut-out part, and a peripheral part of the cut-out part is engaged with the rib part.

3 Claims, 15 Drawing Sheets

(56) References Cited

U.S. PATENT DOCUMENTS

2009/0064592 A1\* 3/2009 Takase ................... B60J 10/277
            49/374
2018/0229670 A1\* 8/2018 Bito ......................... B60J 10/30
2018/0339582 A1\* 11/2018 Taketomo ................ B60J 10/76

\* cited by examiner

MOUNTING STRUCTURE FOR DOORFRAME MOLDING

INCORPORATION BY REFERENCE

The disclosure of Japanese Patent Application No. 2017-012091 filed on Jan. 26, 2017 including the specification, drawings and abstract is incorporated herein by reference in its entirety.

BACKGROUND

1. Technical Field

The disclosure relates to a mounting structure for a doorframe molding of a vehicle.

2. Description of Related Art

As described in, for example, Japanese Patent Application Publication No. 2006-105290 (JP 2006-105290 A) stated below, there is a known structure that fixes a molding decorating each part of a vehicle body (for example, an inner peripheral part of a window frame) to a vehicle body. In JP 2006-105290 A, a clip is assembled to the molding in advance, and the clip is inserted into and engaged with a hole provided in the vehicle body. This clip includes an engaging claw for temporary fixation and an engaging claw for permanent fixation (see FIG. 6 and FIG. 7 in JP 2006-105290 A). The engaging claw for temporary fixation and the engaging claw for permanent fixation are provided in one clip. The engaging claw for temporary fixation and the engaging claw for permanent fixation are arranged in series along a center axis direction (an insertion direction into the hole) of the clip. The engaging claw for temporary fixation is arranged in a tip part of the clip, and the engaging claw for permanent fixation is arranged in an intermediate part of the clip. Also, a molding body is assembled to an end of the clip (an end part opposite to the engaging claw for temporary fixation). As an operator inserts the tip of the clip into the hole and lightly pushes the molding to the vehicle body side, the engaging claw for temporary fixation enters the hole, and the molding is temporarily fixed to the vehicle body (see FIG. 6 in JP 2006-105290 A). Then, when the molding is pushed further to the vehicle body side, the claw for permanent fixation enters the hole, and the molding is permanently fixed to the vehicle body (see FIG. 7 in JP 2006-105290 A).

SUMMARY

The engaging claw for temporary fixation of the clip in JP 2006-105290 A has a pair of engaging parts located on opposite sides in a view from the center axis of the clip. From the tip side towards the end side of the engaging claw, a distance between the pair of engaging parts becomes larger. The distance between the pair of engaging parts on the tip side is smaller than an inside diameter of the hole, and the distance between the pair of engaging parts on the end side is larger than the inside diameter of the hole. The pair of engaging parts can be pressed towards the center axis side of the clip and deform elastically. When the engaging claw for temporary fixation passes through the hole, the pair of engaging parts abut on an inner peripheral surface of the hole, are pressed towards the center axis side of the clip, and deformed elastically. This means that the engaging claw for temporary fixation is contracted. Then, once the entire engaging claw for temporary fixation gets into the vehicle body, the pair of engaging parts are restored, and end side parts of the pair of engaging parts abut on a peripheral part of the hole. Thus, the clip does not come off from the vehicle body. This means that the molding is temporarily fixed to the vehicle body. In JP 2006-105290 A, there is no means provided for contracting the engaging claw for temporary fixation that has gotten into the vehicle body. Therefore, it is not possible to remove the molding from the vehicle body without breaking the engaging part by strongly pulling the molding.

The disclosure provides a mounting structure for a doorframe molding, which allows the doorframe molding to be temporarily fixed to a doorframe, and the mounting structure allows the doorframe molding to be attached and detached easily. In the description of each component of the disclosure stated below, the reference numerals are stated for corresponding parts of the embodiment in order to facilitate understanding of the disclosure. However, interpretation of the respective components of the disclosure should not be limited to structures of corresponding parts shown by the reference numerals in the embodiment.

A mounting structure for a doorframe molding according to an aspect of the disclosure includes an upper edge part that structures an upper side of a window frame of a vehicle door, an engaging part that includes a shaft part projecting downwardly from the upper edge part, and a rib part extending from a lower end of the shaft part in a vehicle front-rear direction or a vehicle width direction, a body part of the doorframe molding extending along an inner peripheral part of the upper side of the window frame, and a bracket that is mounted on a surface of the body part on an interior side, projects from the body part to the interior side, and is engaged with the engaging part. The bracket has a cut-out part that is made by cutting out the bracket from an end part on the interior side into an exterior side. The shaft part is inserted into the cut-out part from the end part on the interior side, and a peripheral part of the cut-out part is engaged with the rib part.

In the foregoing aspect, the mounting structure may further include a groove-shaped member, to which a weather strip for sealing a gap between the upper edge part and a periphery of a doorway of the vehicle is mounted. The engaging part may be provided in a tip of a clip for fixing the groove-shaped member to the upper edge part. The groove-shaped member extends along the upper edge part and opens upwardly.

In the mounting structure for the doorframe molding structured as above, the shaft part is inserted into the cut-out part, and a peripheral part of the cut-out part is engaged with the rib part. Thus, the doorframe molding is temporarily fixed to the upper edge part. With this mounting structure, when it is necessary to remove the temporarily-fixed doorframe molding, it is possible to easily remove the doorframe molding without damaging members, by pulling the doorframe molding to the exterior side. In other words, according to the disclosure, it is possible to easily attach and detach the doorframe molding to and from the upper edge part (the doorframe).

In the foregoing aspect, a projecting part may be provided in the peripheral part of the cut-out part of the bracket.

When an operator holds the doorframe molding structured as above in the hand to temporarily fix it to the upper edge part, a part of the engaging part abuts on the projecting part once. Then, as the operator pushes the doorframe molding a bit strongly towards the doorframe side, the part of the engaging part climbs over the projecting part. At that moment, pressing force of the doorframe molding towards the doorframe becomes light. Thus, the operator is able to confirm from a sense of force whether or not the doorframe molding is temporarily fixed to the upper edge part. Also, in a state where the doorframe molding is temporarily fixed to the doorframe, the projecting part functions as stoppers that restrain the doorframe molding from falling. This means that, even when the doorframe molding is pulled towards the exterior side with relatively small force, a part of the engaging part abuts on the projecting part, thereby restraining the doorframe molding from falling from the doorframe.

In the foregoing aspect, the cut-out part may include a first cut-out part, which is made by cutting out the bracket from an end part on the interior side into the exterior side, and a second cut-out part, which is made by cutting out the bracket from an end part of the first cut-out part into a front or rear side.

In the mounting structure for the doorframe molding structured as above, first of all, the shaft part is inserted into the first cut-out part. Then, the doorframe molding is moved to the rear (or the front), thus inserting the shaft part into the second cut-out part. In a state where the doorframe molding is temporarily fixed to the upper edge part, even if the doorframe molding is pulled to the exterior side, the shaft part abuts on an end surface of the second cut-out part on the interior side. Thus, the doorframe molding is restrained from falling from the upper edge part.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
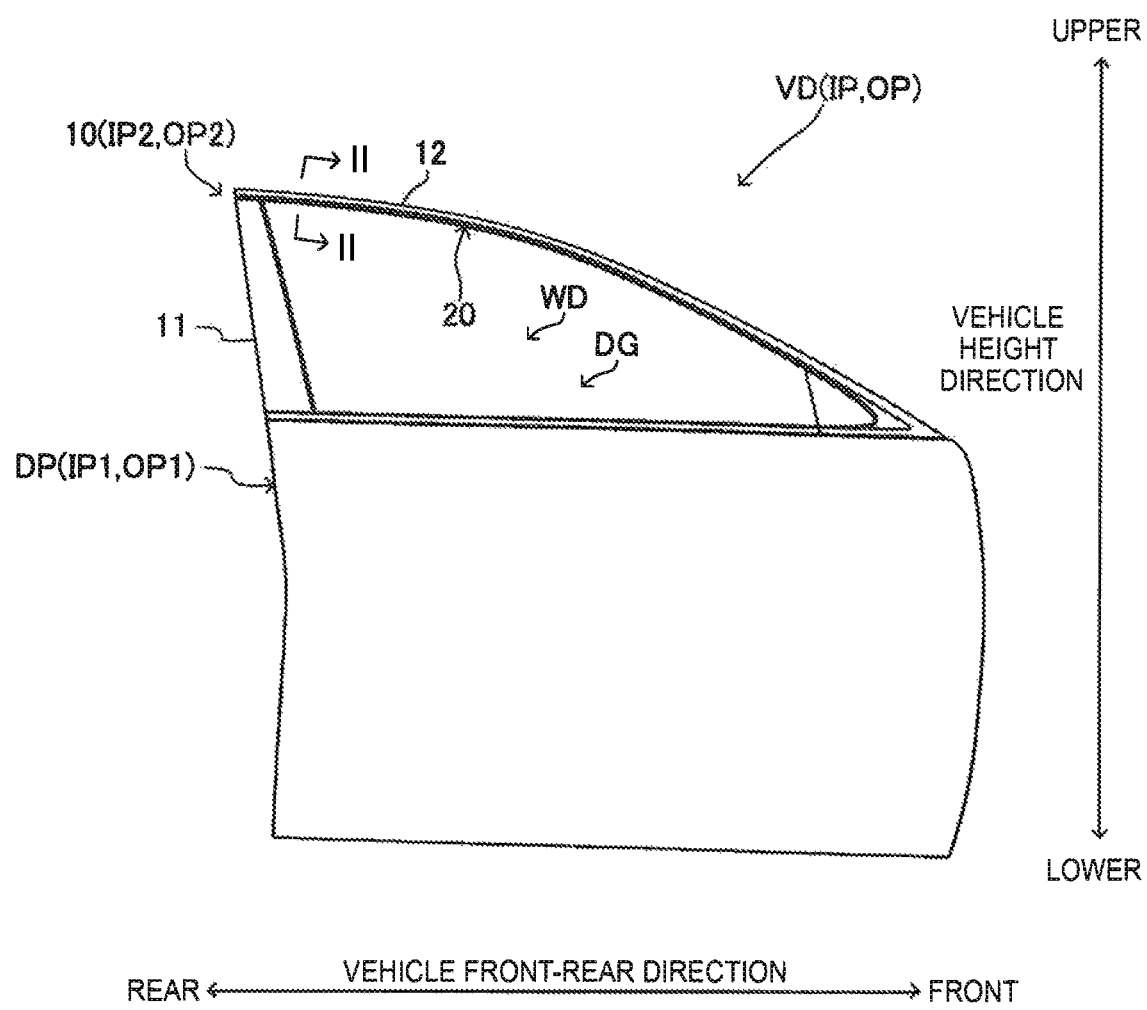
FIG. 1 is a side view of a frontdoor on the right side of a vehicle including a mounting structure for a doorframe molding according an embodiment of the disclosure.

Hereinafter, explanation is given regarding a mounting structure for a doorframe molding according to an embodiment of the disclosure (a structure for mounting a doorframe molding 20 onto a doorframe 10) with reference to the drawings. First of all, as shown in FIG. 1, an outline is given regarding a door VD on the right side of a vehicle, to which the mounting structure for the doorframe molding according to the disclosure is applied. In this embodiment, the mounting structure for the doorframe molding, which is applied to the door VD on the right side of the vehicle, is explained as an example. However, the disclosure is not limited to the door VD on the right side, and may be applied to other doors.

As shown in FIG. 1, the door VD includes a window WD. The door VD is made of an inner panel IP arranged on an interior side and an outer panel OP arranged on an exterior side. The inner panel IP includes a plate-shaped door panel part IP1 arranged underneath the window WD, and a doorframe part IP2, which is arranged above the door panel part IP1 and structures a frame member of the window WD. The door panel part IP1 and the doorframe part IP2 are formed integrally. Meanwhile, the outer panel OP includes a plate-shaped door panel part OP1 arranged underneath the window WD, and a doorframe part OP2, which is provided above the door panel part OP1 and structures the frame member of the window WD. The door panel part OP1 and the doorframe part OP2 are separate bodies. The door panel part IP1 and the door panel part OP1 are superimposed on each other and joined. Hereinafter, a part made by joining the door panel part IP1 and the door panel part OP1 is referred to as a door panel DP. Space is made between the door panel part IP1 and the door panel part OP1. This means that the door panel DP is formed into a bag shape. Inside the door panel DP, a window regulator device (not shown) is incorporated. A door glass DG, which is able to advance and retreat above the door panel DP, is assembled to the window regulator device. The door glass DG is moved up and down by the window regulator device. Also, the doorframe part IP2 and the doorframe part OP2 are superimposed on each other and joined. Hereinafter, a part made by joining the doorframe part IP2 and the doorframe part OP2 is referred to as a doorframe 10. The doorframe 10 is the frame member of the window WD, and is structured so as to surround an outer peripheral part (an upper edge part, a front edge part, and a rear edge part) of the door glass DG that advances above the door panel DP.

The doorframe 10 includes a vertical column part 11 and an upper edge part 12. The vertical column part 11 extends from a rear end part of the door panel DP upwardly and also slightly to the rear side. This means that, in a view from the left side of the door VD, the longitudinal direction of the vertical column part 11 is slightly inclined with respect to the vehicle height direction.

Figure 2:
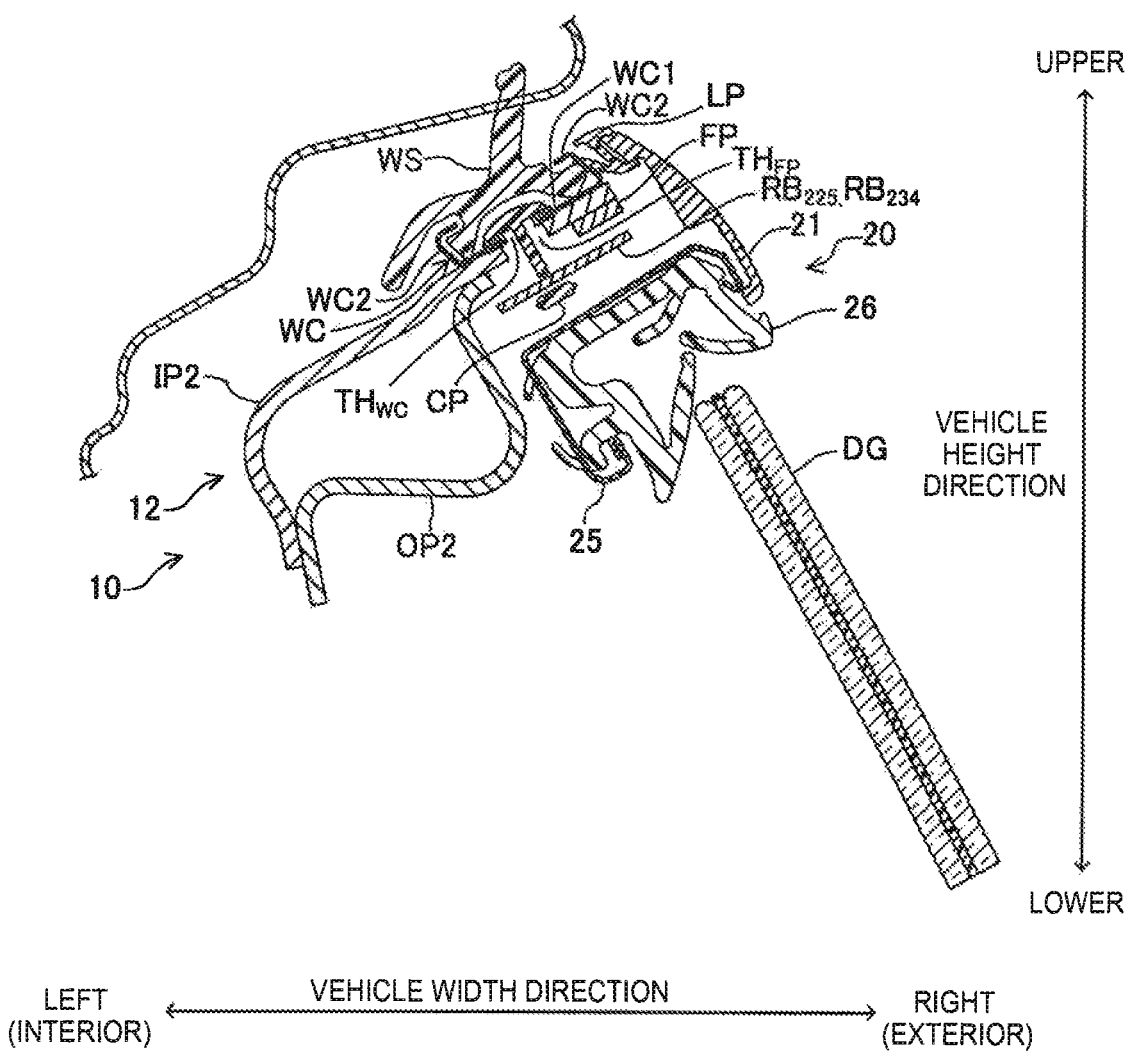
FIG. 2 is a sectional view taken along II-II in FIG. 1.

In a side view of the door VD, the upper edge part 12 has a curved shape (arch shape) projecting upwardly. As shown in FIG. 2, a right end part of the upper edge part 12 (an end part on the exterior side) is formed into a single plate shape in a state where end parts of the doorframe part IP2 and the doorframe part OP2, which are formed into a plate shape, are superimposed on each other and joined. In the following explanation, this part is referred to as a plate-shaped part FP. The plate-shaped part FP is slightly inclined with respect to the vehicle width direction (see FIG. 2). This means that the right end (the exterior side) of the plate-shaped part FP is located slightly higher than the left end (the interior side). In the plate-shaped part FP, a plurality of through-holes $TH_{FP}$ are formed at given intervals in the longitudinal direction of the upper edge part 12. When seen from above (or below) the plate-shaped part FP, each of the through-holes $TH_{FP}$ has a rectangular shape extending in the longitudinal direction of the upper edge part 12.

Figure 3:
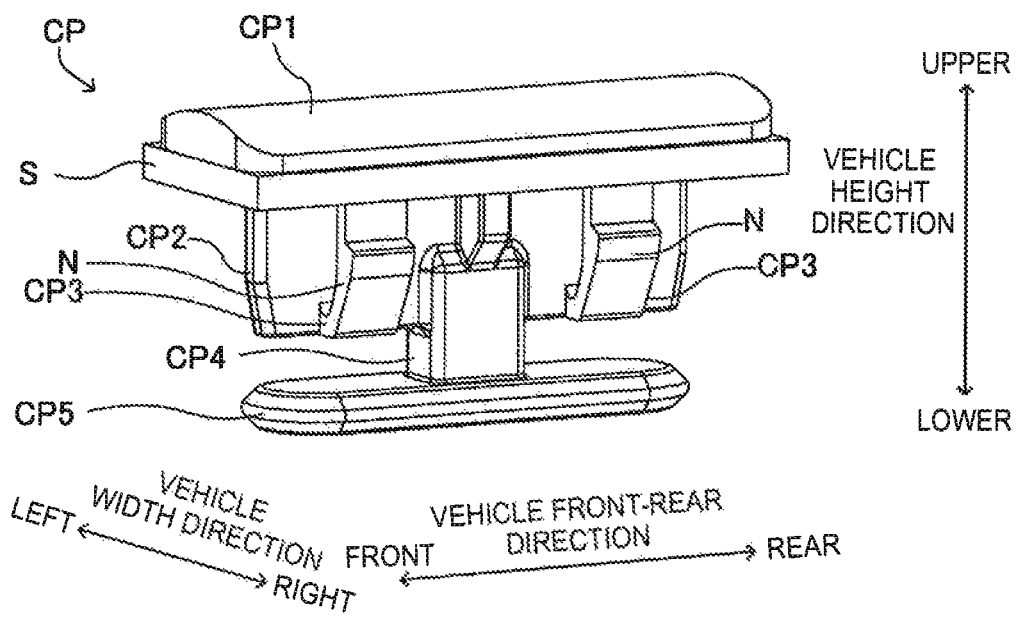
FIG. 3 is a perspective view of a clip.

On an upper surface of the plate-shaped part FP, a weather strip channel WC is assembled. The weather strip channel WC extends along the plate-shaped part FP of the upper edge part 12. The weather strip channel WC is a groove-shaped member that is open upwardly. This means that the weather strip channel WC has a bottom wall part WC1 and side wall parts WC2, WC2. In the bottom wall part WC1, a plurality of through-holes $TH_{WC}$ are formed. The through-holes $TH_{WC}$ correspond to the through-holes $TH_{FP}$ of the upper edge part 12, respectively. When seen from above (or below) the weather strip channel WC, each of the through-holes $TH_{WC}$ has a rectangular shape extending in the longitudinal direction of the weather strip channel WC. A length of a long side of the through-hole $TH_{WC}$ is the same as a length of a long side of the through-hole $TH_{FP}$, and a length of a short side of the through-hole $TH_{WC}$ is the same as a length of a short side of the through-hole $TH_{FP}$. The weather strip channel WC is fixed to the upper edge part 12 by using a clip CP shown in FIG. 3.

The clip CP is made from synthetic resin. The clip CP includes a top plate part CP1, a base part CP2, claw parts CP3, CP3, a shaft part CP4, and a rib part CP5. The top plate part CP1, the base part CP2, the claw parts CP3, CP3, the shaft part CP4, and the rib part CP5 are formed integrally. The top plate part CP1 is parallel to the bottom wall part WC1 of the weather strip channel WC. The top plate part CP1 extends in the longitudinal direction of the weather strip channel WC. The long side of top plate part CP1 is slightly larger than the long side of the through-hole $TH_{WC}$, and the short side of the top plate part CP1 is slightly larger than the short side of the through-hole $TH_{WC}$. Further, a center portion of the top plate part CP1 in the short side direction bulges slightly upwardly. This means that a thickness of the center portion of the top plate part CP1 in the short side direction is slightly larger than thicknesses of both end parts in the short side direction. Also, on a lower surface of the top plate part CP1, a rectangular frame-shaped seal member S made from synthetic rubber is adhered.

The base part CP2 is formed into a generally rectangular plate shape, extending downwardly from the lower surface of the top plate part CP1. The base part CP2 is perpendicular to the lower surface of the top plate part CP1. Also, the long side direction of the base part CP2 is parallel to the long side direction of the top plate part CP1. The long side of the base part CP2 is slightly shorter than the long side of the through-hole $TH_{FP}$. The short side of the base part CP2 is longer than the thickness of the plate-shaped part FP. The claw parts CP3, CP3 are formed on both end parts of the base part CP2 in the long side direction (the vehicle front-rear direction), respectively. The claw part CP3 includes a pair of engaging claws N, N extending from a right surface and a left surface of the base part CP2 towards the top plate part CP1, respectively (see FIG. 4). The engaging claw N is formed into a curved plate shape. The short side direction of the engaging claw N is parallel to the long side direction of the base part CP2. A lower end part of the engaging claw N is connected with a lower end part of the base part CP2, and the engaging claw N, except its lower end part, is separated from the base part CP2. Towards the upper side of the engaging claw N, a distance between the engaging claw N and the base part CP2 becomes larger gradually. A rate of change of the distance between the engaging claw N and the base part CP2 becomes gradually smaller towards the upper side of the engaging claw N. This means that, when seen from the front side (or the rear side) of the clip CP, the engaging claw N has a curved shape (arch shape) projecting downwardly. From the lower end part towards an intermediate part of the engaging claw N, the thickness of the engaging claw N becomes gradually larger. The thickness of a part of the engaging claw N from its intermediate part through the upper end part is smaller than the thickness of the intermediate part. In other words, the upper end part of the engaging claw N is formed into a thin plate shape, and extends upwardly (towards the top plate part CP1) from the end part of the intermediate part on the base part CP2 side. Thus, a level difference is formed in a connecting part between the intermediate part and the upper end part. A distance between the intermediate parts of the engaging claws N, N of the claw part CP3 is slightly larger than the short side of the through-hole $TH_{FP}$.

The shaft part CP4 extends downwardly from a center portion of the base part CP2 in the long side direction. The shaft part CP4 is formed into a prism shape. The rib part CP5 is formed into a rectangular plate shape, which is parallel to the top plate part CP1. The long side of the rib part CP5 is slightly smaller than the long side of the through-hole $TH_{FP}$, and the short side of the rib part CP5 is slightly smaller than the short side of the through-hole $TH_{FP}$. A center portion of the rib part CP5 is connected with a lower end surface of the shaft part CP4.

Figure 4:
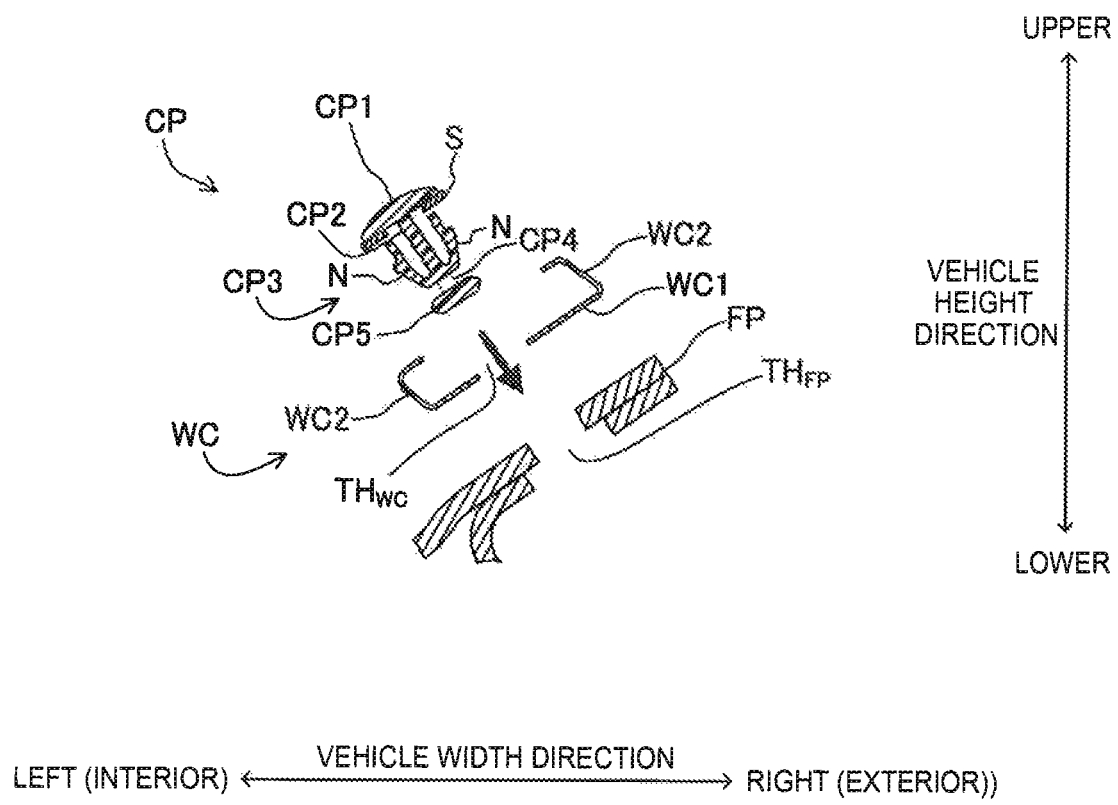
FIG. 4 is a procedure view showing procedures to assemble a weather strip channel to a doorframe.

As shown in FIG. 4, the lower surface of the bottom wall part WC1 of the weather strip channel WC abuts on the upper surface of the plate-shaped part FP of the upper edge part 12, and positions of each of the through-holes $TH_{FP}$ and each of the through-holes $TH_{WC}$ are aligned. The clip CP is inserted into each of the through-holes $TH_{WC}$ and each of the through-holes $TH_{FP}$ from above the bottom wall part WC1. The engaging claws N, N of each of the claw parts CP3 abut on inner peripheral surfaces of each of the through-holes $TH_{WC}$ and each of the through-holes $TH_{FP}$, and are bent (elastically deformed) towards the base part CP2. When the intermediate parts of the engaging claws N, N pass the through-hole $TH_{FP}$ and reach the lower side of the plate-shaped part FP, the elastically deformed engaging claws N, N are restored. This means that the distance between the intermediate parts of the engaging claws N, N becomes large. In a region provided between boundary portions of the intermediate parts and upper end parts of the engaging claws N, N, the clip CP abuts on the peripheral part of the through-hole $TH_{FP}$, and the clip CP does not come off from each of the through-holes $TH_{WC}$ and each of the through-holes $TH_{FP}$. Thus, the weather strip channel WC is engaged with the plate-shaped part FP by the clip CP. In this state, the seal member S is sandwiched between and in close contact with the upper surface of the bottom wall part WC1 and the lower surface of the top plate part CP1. The upper end parts of the engaging claws N, N abut on the inner peripheral surfaces of the through-hole $TH_{WC}$ and through-hole $TH_{FP}$.

A weather strip WS is fitted into the weather strip channel WC (see FIG. 2). The weather strip WS extends along the weather strip channel WC, and seals a space between a vehicle doorway and the upper edge part 12 in a state where the door VD is closed. This means that the weather strip WS abuts on a periphery of the vehicle doorway and restrains entrance of foreign mattes (rainwater, dust, etc.) into a cabin.

Figure 5:
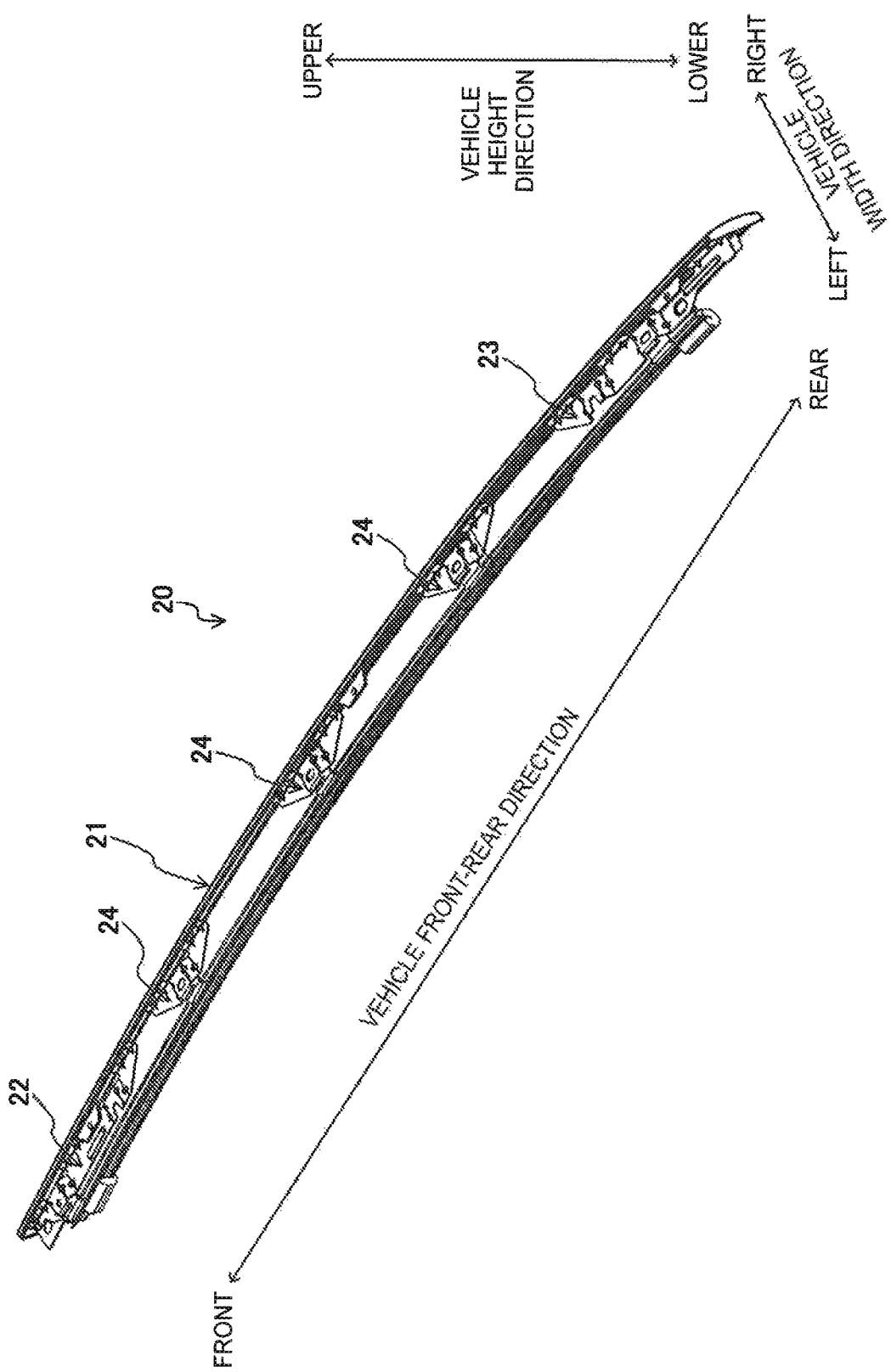
FIG. 5 is a perspective view of the doorframe molding.

Next, a structure of the doorframe molding 20 is explained. The doorframe molding 20 extends along the upper edge part 12. As shown in FIG. 5, the doorframe molding 20 includes a body part 21 and brackets 22, 23, 24. Further, the doorframe molding 20 includes a glass run rail 25 and a glass run 26 (see FIG. 2).

The body part 21 is made from a zinc alloy. The body part 21 extends along the upper edge part 12, and is also formed into a plate shape generally perpendicular to the plate-shaped part FP. Further, a lip member LP, which is made from synthetic rubber and extends in the longitudinal direction of the body part 21, is adhered to an upper end part of a left surface of the body part 21 (see FIG. 2). The body part 21 is supported by the brackets 22, 23, 24.

The brackets 22, 23, 24 are formed by pressing a metallic plate. The bracket 22 is assembled to a front end part of the body part 21, and the bracket 23 is assembled to a rear end part of the body part 21 (see FIG. 5). The brackets 24 are arranged between the bracket 22 and the bracket 23. There are three brackets 24 arranged at generally equal intervals along the longitudinal direction of the body part 21.

Figure 6:
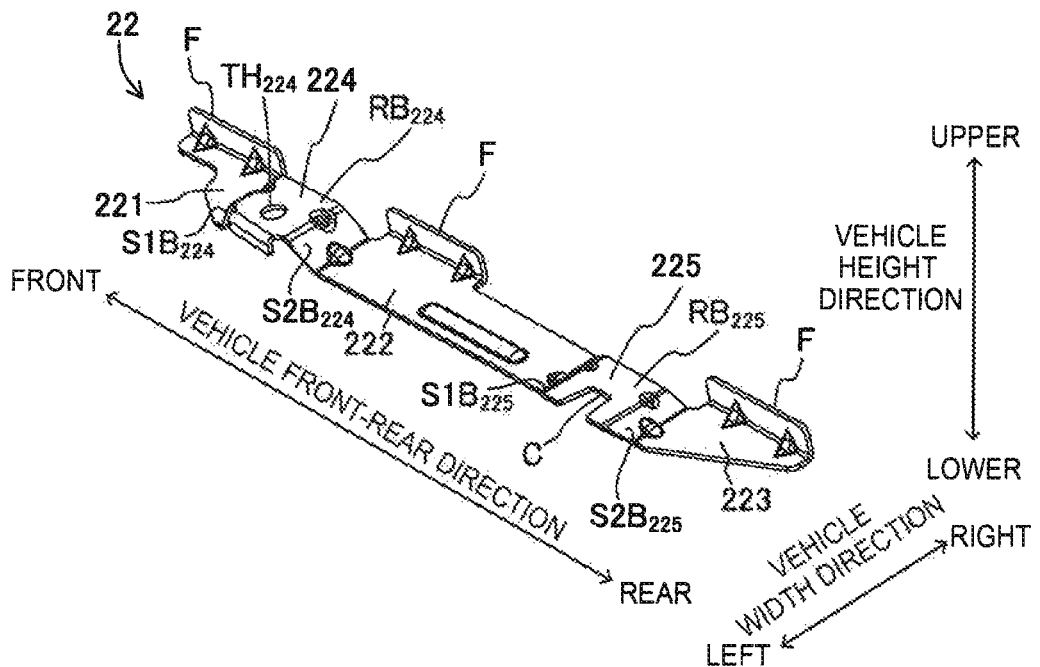
FIG. 6 is a perspective view of a bracket arranged in a front part of the doorframe molding.

As shown in FIG. 6, the bracket 22 has bottom parts 221, 222, 223 and bottom raising parts 224, 225. The bottom parts 221, 222, 223 are arranged at intervals in the longitudinal direction of the body part 21. The bottom part 221 is located in the front end of the bracket 22, and the bottom part 223 is located in the rear end of the bracket 22. Further, the bottom part 222 is located in an intermediate part of the bracket 22. The bottom parts 221, 222, 223 are formed into plate shapes, which are generally perpendicular to the body part 21. Flange parts F extending upwardly are provided in right end parts of the bottom parts 221, 222, 223, respectively.

The bottom raising part 224 is provided between the bottom part 221 and the bottom part 222. Also, the bottom raising part 225 is provided between the bottom part 222 and the bottom part 223. The bottom raising part 224 has an upper bottom part $RB_{224}$ and inclined plate parts $S1B_{224}$, $S2B_{224}$. The upper bottom part $RB_{224}$ is formed into a plate shape perpendicular to the body part 21. In a center portion of the upper bottom part $RB_{224}$, a circular through-hole $TH_{224}$ is formed. The inclined plate part $S1B_{224}$ connects a front end of the upper bottom part $RB_{224}$ and a rear end of the bottom part 221. The inclined plate part $S2B_{224}$ connects a rear end of the upper bottom part $RB_{224}$ and a front end of the bottom part 222.

The bottom raising part 225 has an upper bottom part $RB_{225}$ and an inclined plate parts $S1B_{225}$, $S2B_{225}$. The upper bottom part $RB_{225}$ is formed into a plate shape perpendicular to the body part 21. A cut-out part C is provided in a left end part of the upper bottom part $RB_{225}$. When seen from above the bracket 22, the cut-out part C has a trapezoidal shape. This means that a dimension of the cut-out part C in the front-rear direction becomes gradually smaller from the left end part of the upper bottom part $RB_{225}$ towards the right side. To be in more detail, as described later, the cut-out part C of the bracket 22 corresponds to the clip CP that fixes a front end part of the weather strip channel WC to the plate-shaped part FP. The inclined plate part $S1B_{225}$ connects a front end of the upper bottom part $RB_{225}$ and a rear end of the bottom part 222. The inclined plate part $S2B_{225}$ connects a rear end of the upper bottom part $RB_{225}$ and a front end of the bottom part 223.

Figure 7:
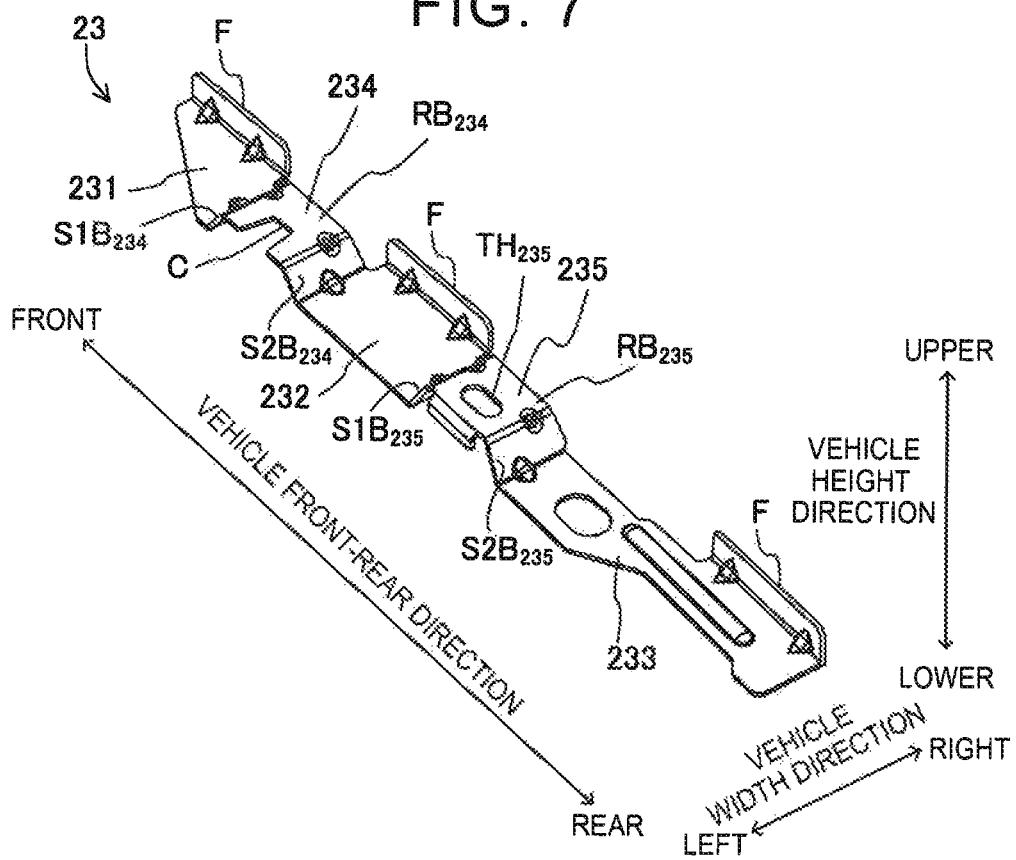
FIG. 7 is a perspective view of a bracket arranged in a rear end part of the doorframe molding.

The bracket 23 has a shape obtained by inverting the bracket 22 in the front-rear direction. This means that, as shown in FIG. 7, the bracket 23 has bottom parts 231, 232, 233, and bottom raising parts 234, 235. The bottom parts 231, 232, 233 are provided at intervals in the longitudinal direction of the body part 21. The bottom part 231 is located in a front end of the bracket 23, the bottom part 233 is located in a rear end of the bracket 23. Also, the bottom part 232 is located in an intermediate part of the bracket 23. The bottom parts 231, 232, 233 are formed into plate shapes that are generally perpendicular to the body part 21. In right end parts of the bottom parts 231, 232, 233, flange parts F extending upwardly are provided, respectively.

The bottom raising part 234 is provided between the bottom part 231 and the bottom part 232. Also, the bottom raising part 235 is provided between the bottom part 232 and the bottom part 233. The bottom raising part 234 includes an upper bottom part $RB_{234}$ and inclined plate parts $S1B_{234}$, $S2B_{234}$. The upper bottom part $RB_{234}$ is formed into a plate shape perpendicular to the body part 21. In a left end part of the upper bottom part $RB_{234}$, a cut-out part C is provided. When seen from above the bracket 23, the cut-out part C has a trapezoidal shape. This means that a dimension of the cut-out part C in the front-rear direction becomes gradually smaller from the left end part of the upper bottom part $RB_{234}$ to the right side. To be in more detail, as described later, the cut-out part C of the bracket 23 corresponds to the clip CP that fixes a front end part of the weather strip channel WC to the plate-shaped part FP. The inclined plate part $S1B_{234}$ connects a front end of the upper bottom part $RB_{234}$ and a rear end of the bottom part 231. The inclined plate part $S2B_{234}$ connects a rear end of the upper bottom part $RB_{234}$ and a front end of the bottom part 232.

The bottom raising part 235 includes an upper bottom part $RB_{235}$ and inclined plate parts $S1B_{235}$, $S2B_{235}$. The upper bottom part $RB_{235}$ is formed into a plate shape perpendicular to the body part 21. In a center portion of the upper bottom part $RB_{235}$, an elliptical through-hole $TH_{235}$ extending in the longitudinal direction of the bracket 23 is formed. The inclined plate part $S1B_{235}$ connects a front end of the upper bottom part $RB_{235}$ and a rear end of the bottom part 232. The inclined plate part $S2B_{235}$ connects a rear end of the upper bottom part $RB_{235}$ and a front end of the bottom part 233.

Figure 8:
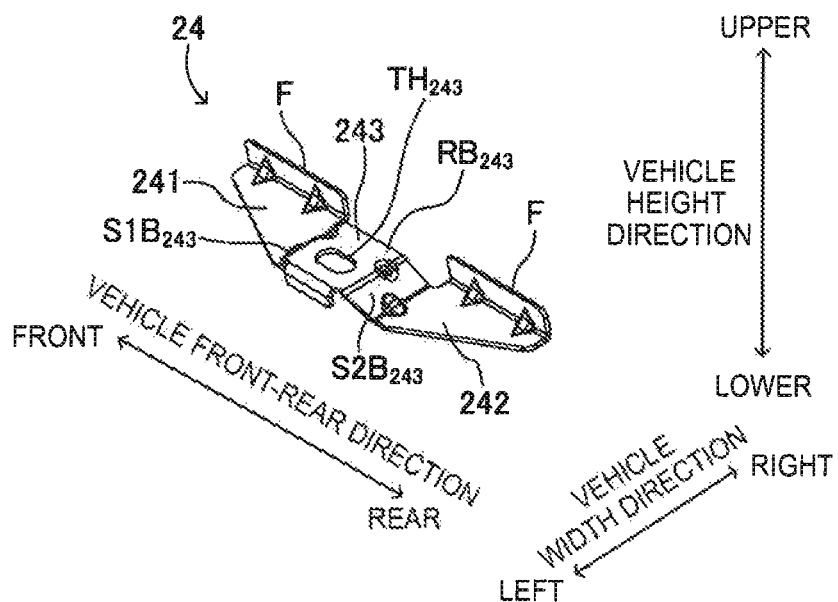
FIG. 8 is a perspective view of a bracket arranged in an intermediate part of the doorframe molding.

As shown in FIG. 8, the bracket 24 includes bottom parts 241, 242, and a bottom raising part 243. The bottom parts 241, 242 are provided at intervals in the longitudinal direction of the body part 21. The bottom part 241 is located in a front end of the bracket 24, and the bottom part 242 is located in a rear end of the bracket 24. The bottom parts 241, 242 are formed into plate shapes that are generally perpendicular to the body part 21. In right end parts of the bottom parts 241, 242, flange parts F extending upwardly are provided, respectively.

The bottom raising part 243 is provided between the bottom part 241 and the bottom part 242. The bottom raising part 243 has an upper bottom part $RB_{243}$ and inclined plate parts $S1B_{243}$, $S2B_{243}$. The upper bottom part $RB_{243}$ is formed into a plate shape perpendicular to the body part 21. In a center portion of the upper bottom part $RB_{243}$, an elliptical through-hole $TH_{243}$ extending in the longitudinal direction of the bracket 24 is formed. The inclined plate part $S1B_{243}$ connects a front end of the upper bottom part $RB_{243}$ and a rear end of the bottom part 241. The inclined plate part $S2B_{243}$ connects a rear end of the upper bottom part $RB_{243}$ and a front end of the bottom part 242.

The flange parts F of the brackets 22, 23, 24 are joined to a left surface of the body part 21. For example, the flange parts F and the body part 21 are welded to each other. Further, for example, a boss may be provided in the body part 21, and a through-hole may be provided in the flange part F in advance, and then the boss may be inserted into the through-hole and clamped.

The glass run rail 25 is a groove-shaped member, which is open downwardly and made by bending a metallic plate (see FIG. 2). An upper surface of the glass run rail 25 and lower surfaces of the bottom parts 221, 222, 223, 231, 232, 233, 241, 242 of the brackets 22, 23, 24 are spot-welded. The glass run 26 is fitted to an inner side of the glass run rail 25. The glass run 26 has a lip part that sandwiches and holds an upper edge of the door glass DG from the exterior side and the interior side.

Figure 9:
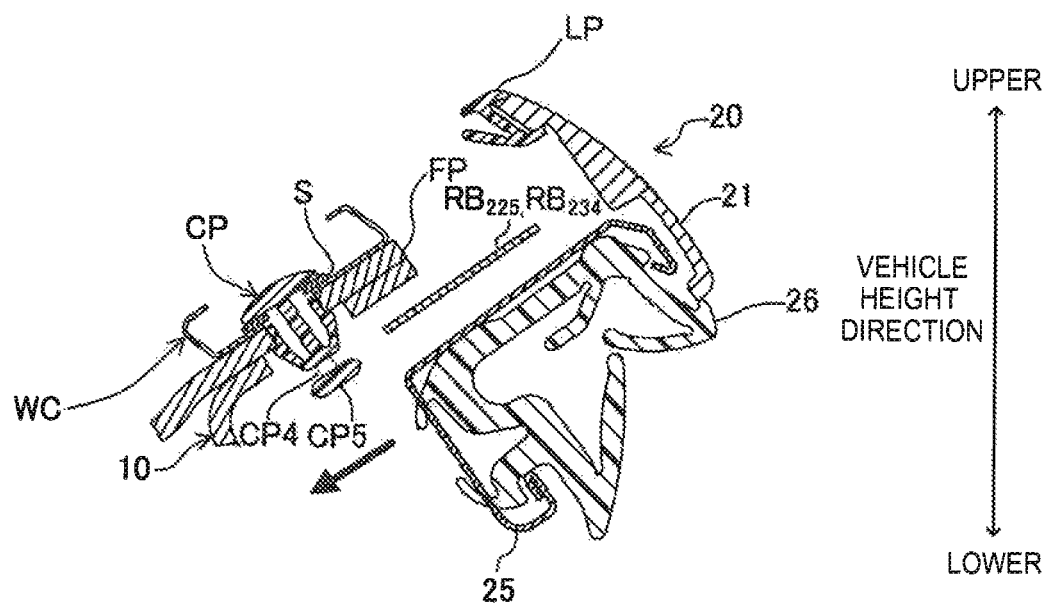
FIG. 9 is a procedure view showing procedures to assemble the doorframe molding to a doorframe.
Figure 10:
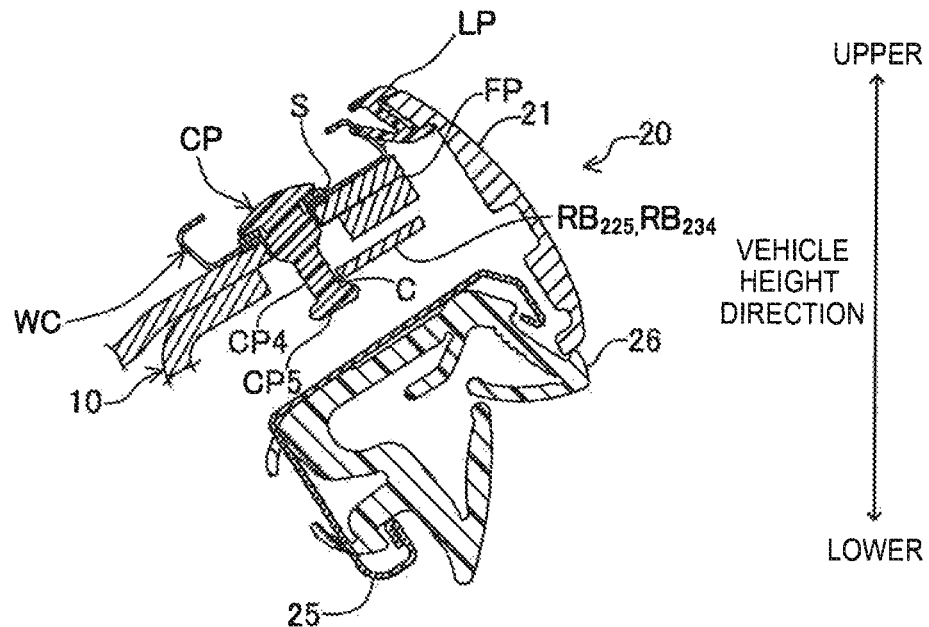
FIG. 10 is a sectional view of a section perpendicular to a longitudinal direction of the doorframe molding and an upper edge part, the section including a center axis of a shaft part of the clip.
Figure 11:
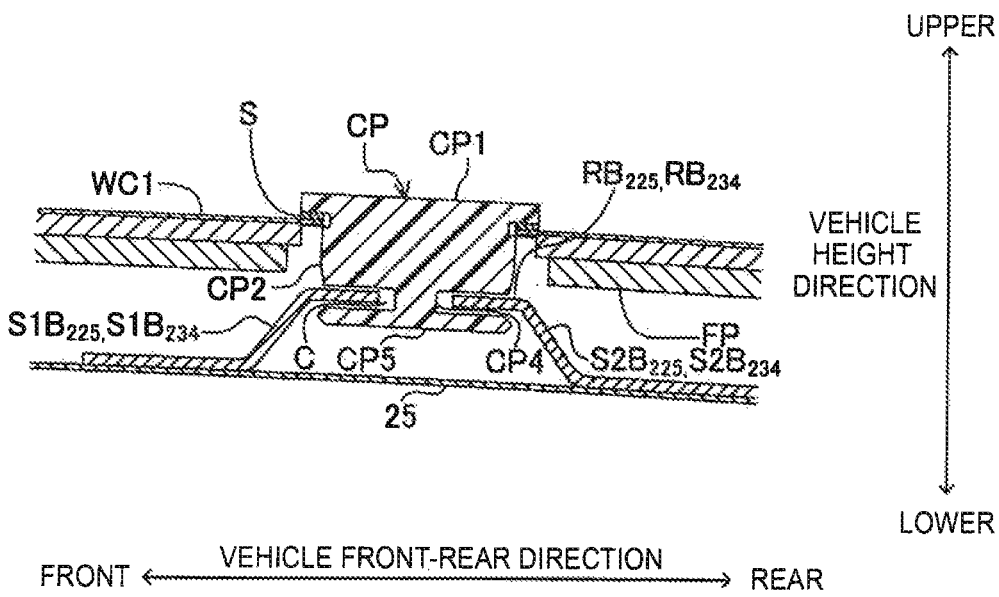
FIG. 11 is a sectional view of a section along the longitudinal direction of the doorframe molding and the upper edge part, the section including the center axis of the shaft part of the clip.

As shown in FIG. 9, the doorframe molding 20 is moved from the right side of the doorframe 10 to the left, and, as shown in FIG. 10 and FIG. 11, the shaft parts CP4 of the clips CP are inserted into the cut-out parts C of the brackets 22, 23 of the doorframe molding 20, respectively. This means that, the peripheral parts of the cut-out parts C are inserted between lower surfaces of the base parts CP2 and upper surfaces of the rib parts CP5, respectively. Thus, the peripheral parts of the cut-out parts C are engaged with the rib parts CP5. In other words, the doorframe molding 20 is temporarily fixed to the doorframe 10 (the upper edge part 12).

Next, the location of the doorframe molding 20 relative to the doorframe 10 is adjusted. Then, fixing tools (for example, screws) (not shown) are inserted into the through-hole $TH_{224}$, the through-hole $TH_{235}$, and the through-hole $TH_{243}$, respectively, allowing the fixing tools to permanently fix the doorframe molding 20 to the doorframe 10. In the state where the doorframe molding 20 is fixed to the doorframe 10, the lip member LP is in a close contact with a side surface of the weather strip channel WC.

In the mounting structure for the doorframe molding structured as above, the peripheral part of the cut-out part C is inserted between the lower surface of the base part CP2 and the upper surface of the rib part CP5, and the peripheral part of the cut-out part C is engaged with the rib part CP5. Because of this, the doorframe molding 20 is temporarily fixed to the doorframe 10 (the upper edge part 12). According to the mounting structure, when it is necessary to remove the temporarily-fixed doorframe molding 20, it is possible to easily remove the doorframe molding 20 without damaging members by pulling the doorframe molding 20 to the exterior side. As described above, according to this embodiment, it is possible to easily attach and detach the doorframe molding 20 to and from the doorframe 10.

Further, the clip CP for fixing the weather strip channel WC to the plate-shaped part FP is provided with the rib part CP5 for temporarily fixing the doorframe molding 20. Therefore, it is possible to reduce the number of parts compared to a case where a rib-shaped member, which is dedicated to temporarily fixing the doorframe molding 20, is provided separately.

Figure 19:
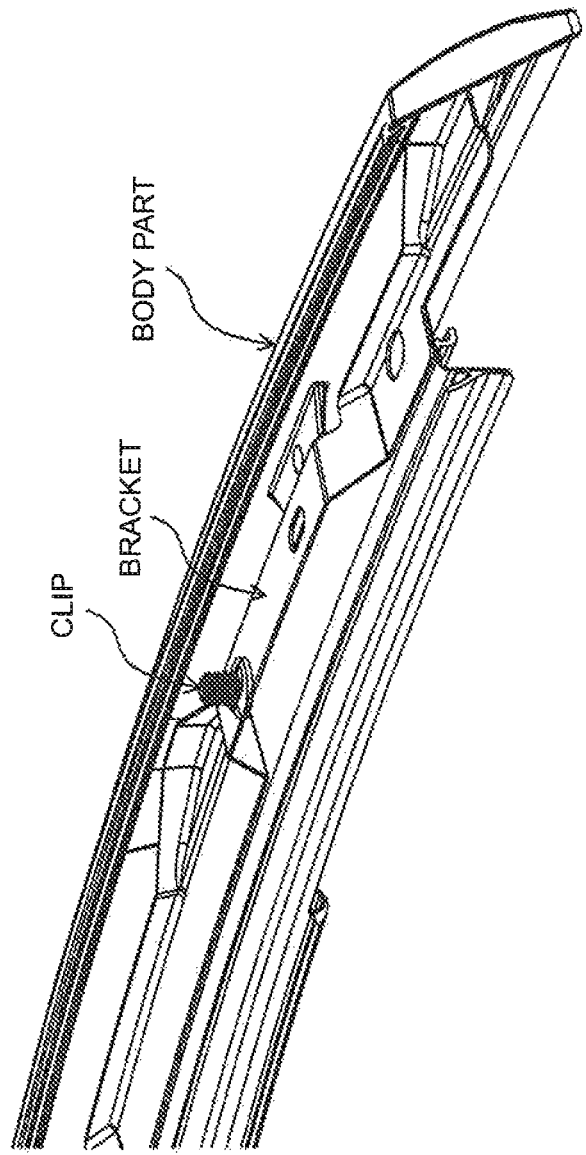
FIG. 19 is a perspective view of a doorframe molding according to a conventional mounting structure for a doorframe molding.
Figure 20:
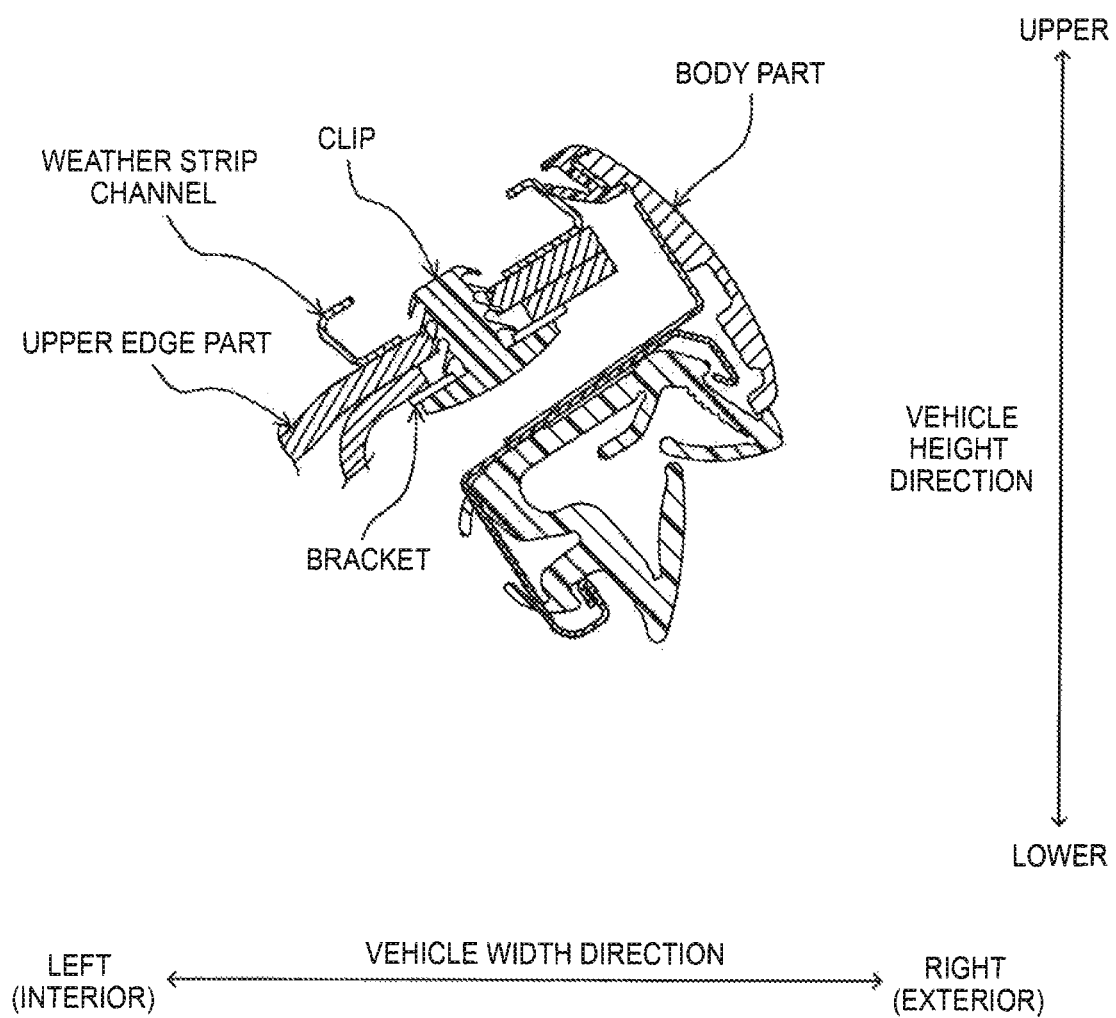
FIG. 20 is a sectional view of a section perpendicular to a longitudinal direction of the doorframe molding and an upper edge part, to which the conventional mounting structure for a doorframe molding is applied.

Moreover, in the molding mounting structure described in JP 2006-105290 A, the engaging claw for temporary fixation and the engaging claw for permanent fixation of the clip are arranged in series along the center axis of the clip. Therefore, the clip is relatively long. For example, as shown in FIG. 19 and FIG. 20, in a case where a doorframe molding is fixed by using a clip similar to that described in JP 2006-105290 A, a relatively long portion of the clip between its intermediate part and tip part projects upwardly from an upper surface of the doorframe. In this case, it is hard to bring a weather strip into close contact with a weather strip channel in this portion, causing space between the weather strip and the weather strip channel, which can allow foreign matters to enter a cabin from the space. Further, foreign matters can also enter a cabin from small space between an inner peripheral surface of a through-hole, in which the clip is inserted, and an outer peripheral surface of the clip.

On the contrary, in this embodiment, although the top plate part CP1 of the clip CP projects into the weather strip channel WC, the amount of projection is smaller than that in the example shown in FIG. 19 and FIG. 20. Therefore, it is easier to bring the weather strip WS into close contact with the weather strip channel WC, thereby preventing foreign matters from entering a cabin. Also, the seal member S is sandwiched between and in close contact with the top plate part CP1 and the weather strip channel WC. Therefore, it is possible to prevent foreign matters from entering a cabin from small space between the inner peripheral surfaces of the through-hole $TH_{WC}$ and the through-hole $TH_{FP}$ and an outer peripheral surface of the clip CP.

Further, in carrying out the disclosure, the disclosure is not limited to the foregoing embodiment, and various changes may be made without departing from the gist of the disclosure.

Figure 12:
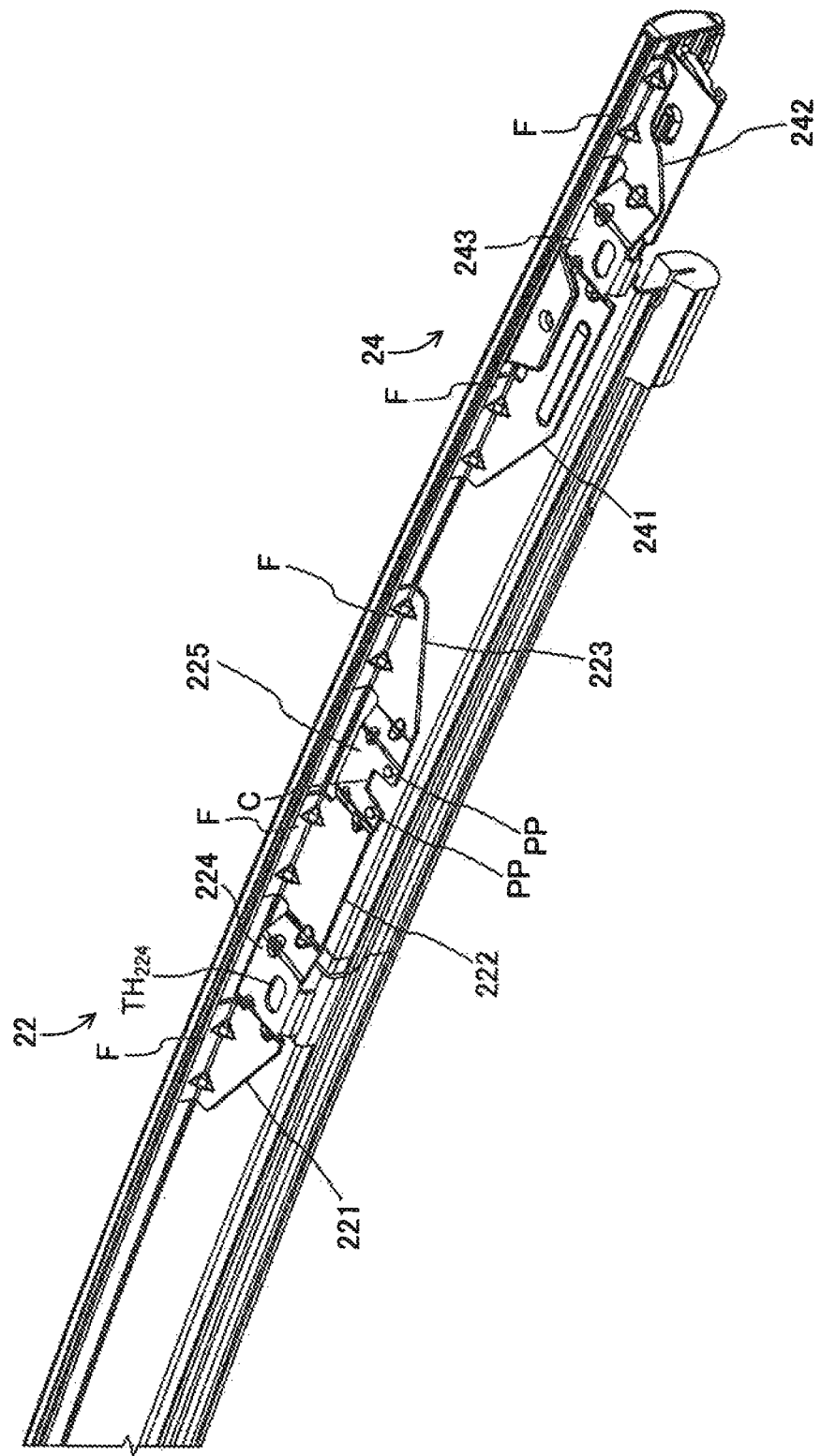
FIG. 12 is a perspective view of a doorframe molding according to a modification of the disclosure, and is a perspective view showing a projecting part provided in a bracket.
Figure 13:
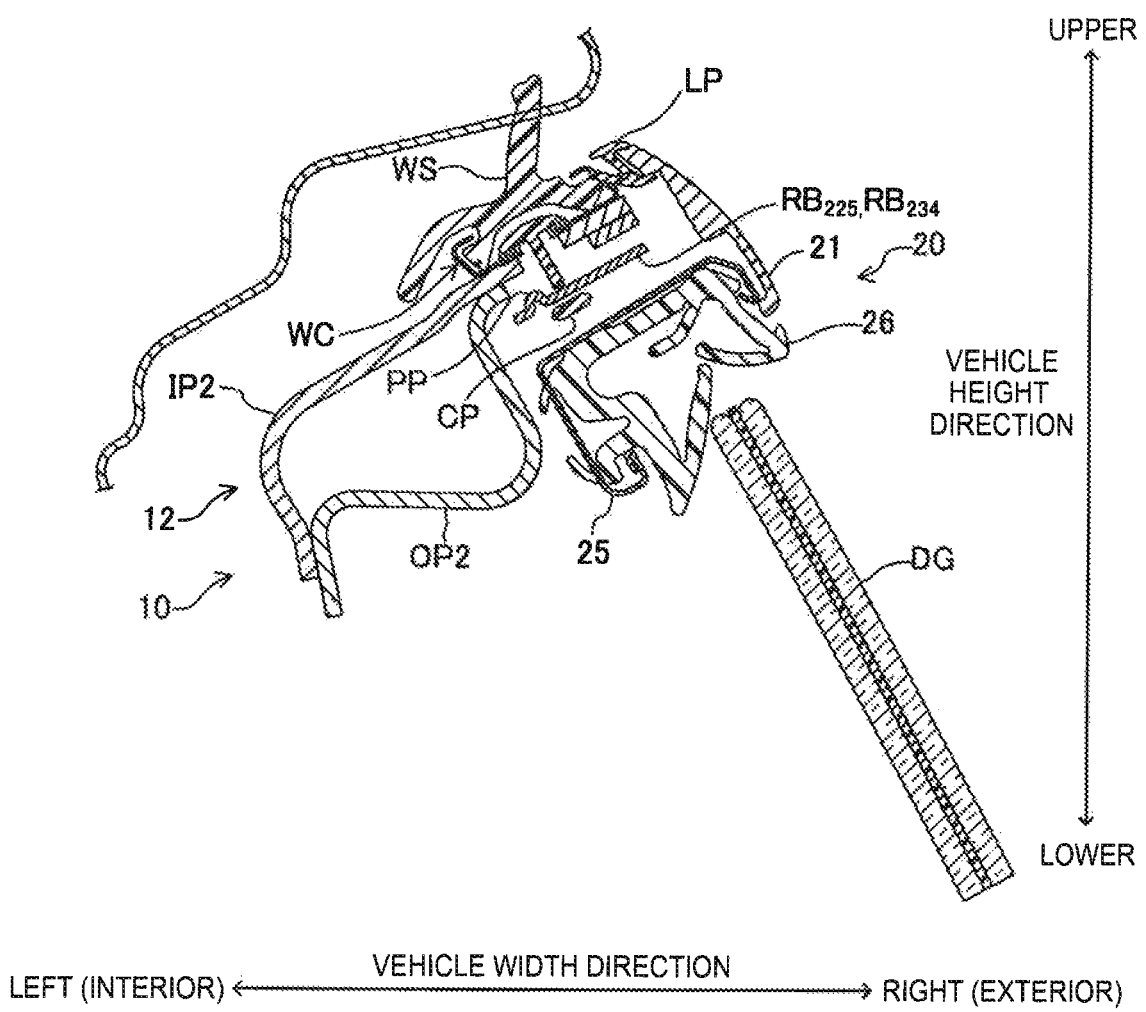
FIG. 13 is a sectional view of a section perpendicular to a longitudinal direction of the doorframe molding and an upper edge part according to the modification of the disclosure, the view showing a section of the projecting part.
Figure 14:
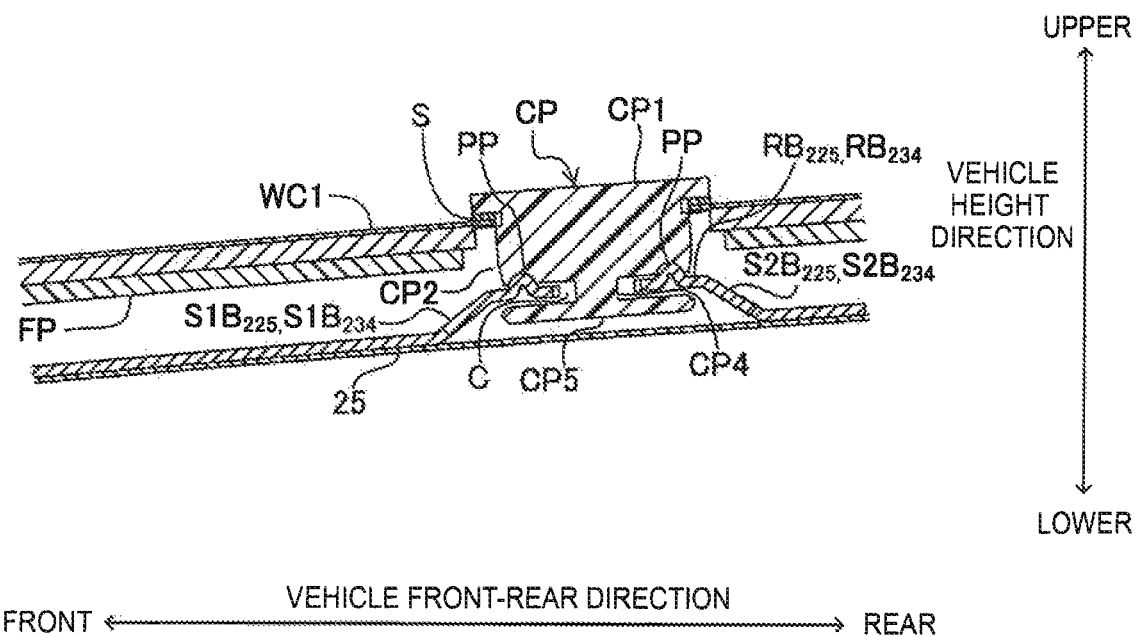
FIG. 14 is a sectional view of a section along the longitudinal direction of the doorframe molding and the upper edge part according to the modification, the view showing a section of the projecting part.

For example, as shown in FIG. 12 to FIG. 14, projecting parts PP, PP may be provided in the peripheral part of the cut-out part C of the bottom raising part 225 (or the bottom raising part 234). When an operator holds the doorframe molding 20 structured as above by the hand to temporarily fix it to the doorframe 10, a lower end part of the base part CP2 abuts on the projecting parts PP, PP once. Then, as the operator pushes the doorframe molding 20 a little strongly towards the doorframe 10 side, the base part CP2 climbs over the projecting parts PP, PP. At that moment, pressing force of the doorframe molding 20 towards the doorframe 10 becomes light. Thus, the operator is able to confirm from a sense of force whether or not the doorframe molding 20 is temporarily fixed to the doorframe 10. Also, in a state where the doorframe molding 20 is temporarily fixed to the doorframe 10, the projecting parts PP, PP function as stoppers that restrain the doorframe molding 20 from falling. This means that, even when the doorframe molding 20 is pulled towards the exterior side with relatively small force, a lower portion of the base part CP2 abuts on the projecting parts PP, PP, thereby restraining the doorframe molding 20 from falling from the doorframe 10.

Figure 15:
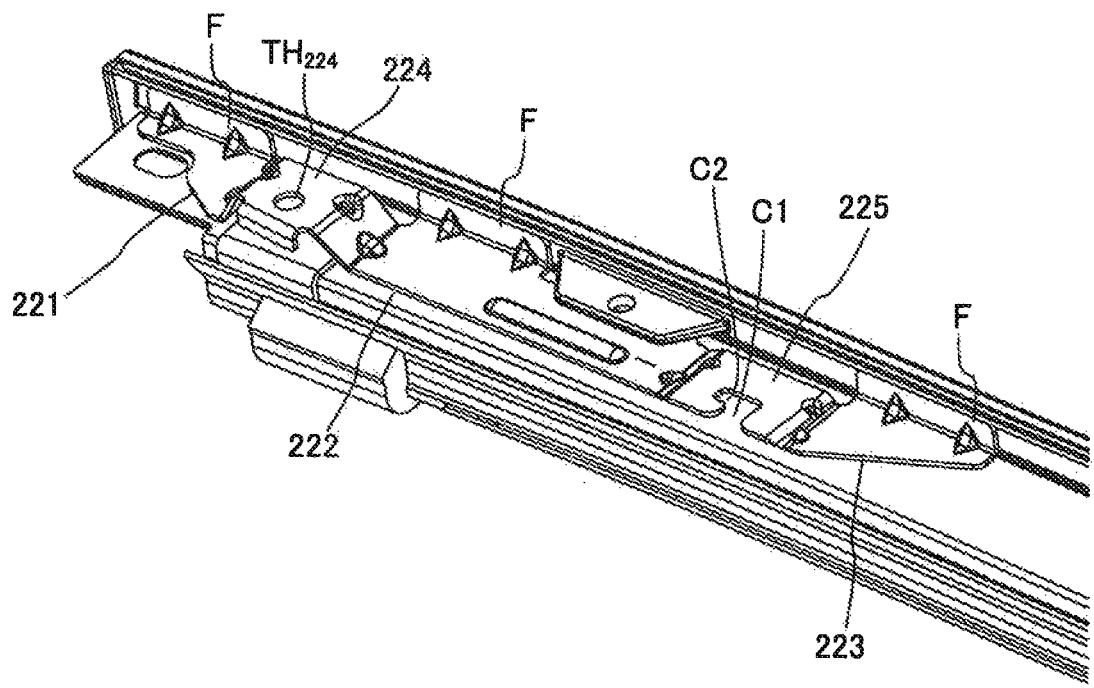
FIG. 15 is an enlarged perspective view of a front end part of a doorframe molding according to another modification of the disclosure.
Figure 16:
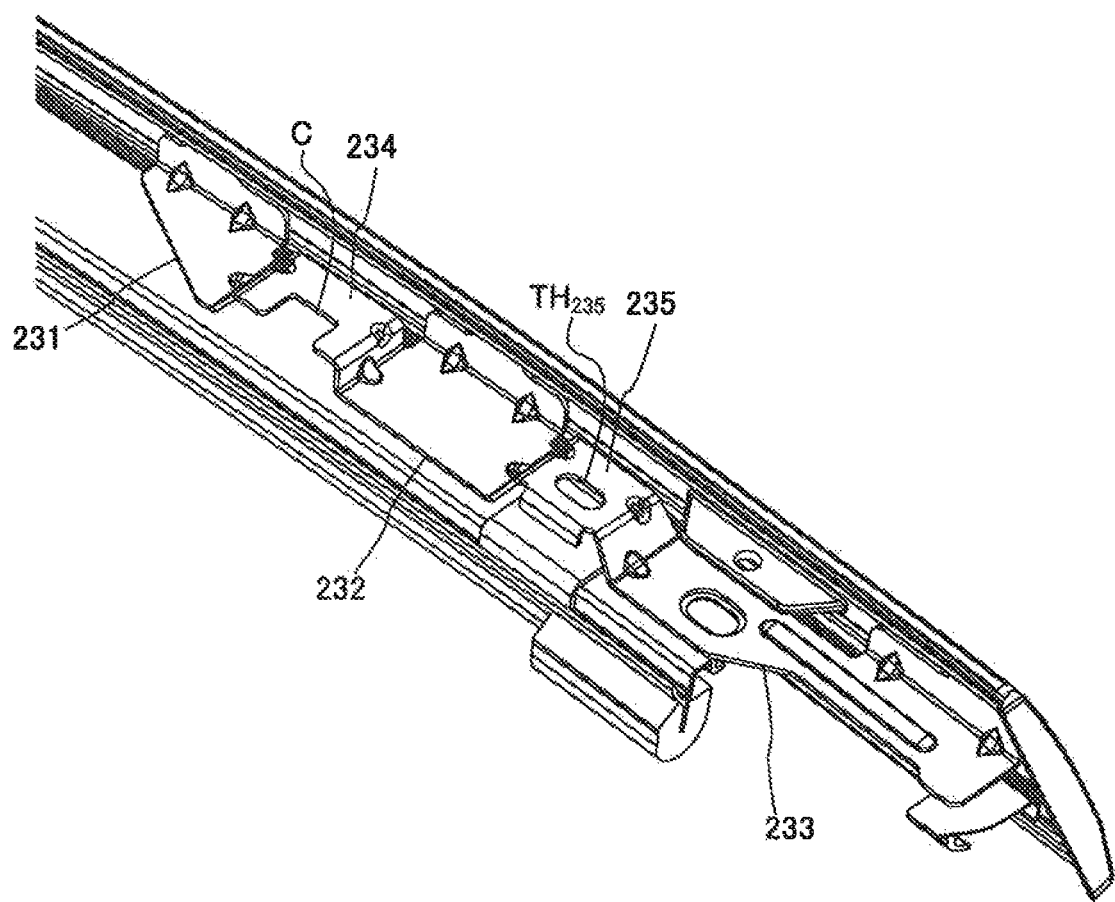
FIG. 16 is an enlarged perspective view of a rear end part of the doorframe molding according to another modification of the disclosure.
Figure 17:
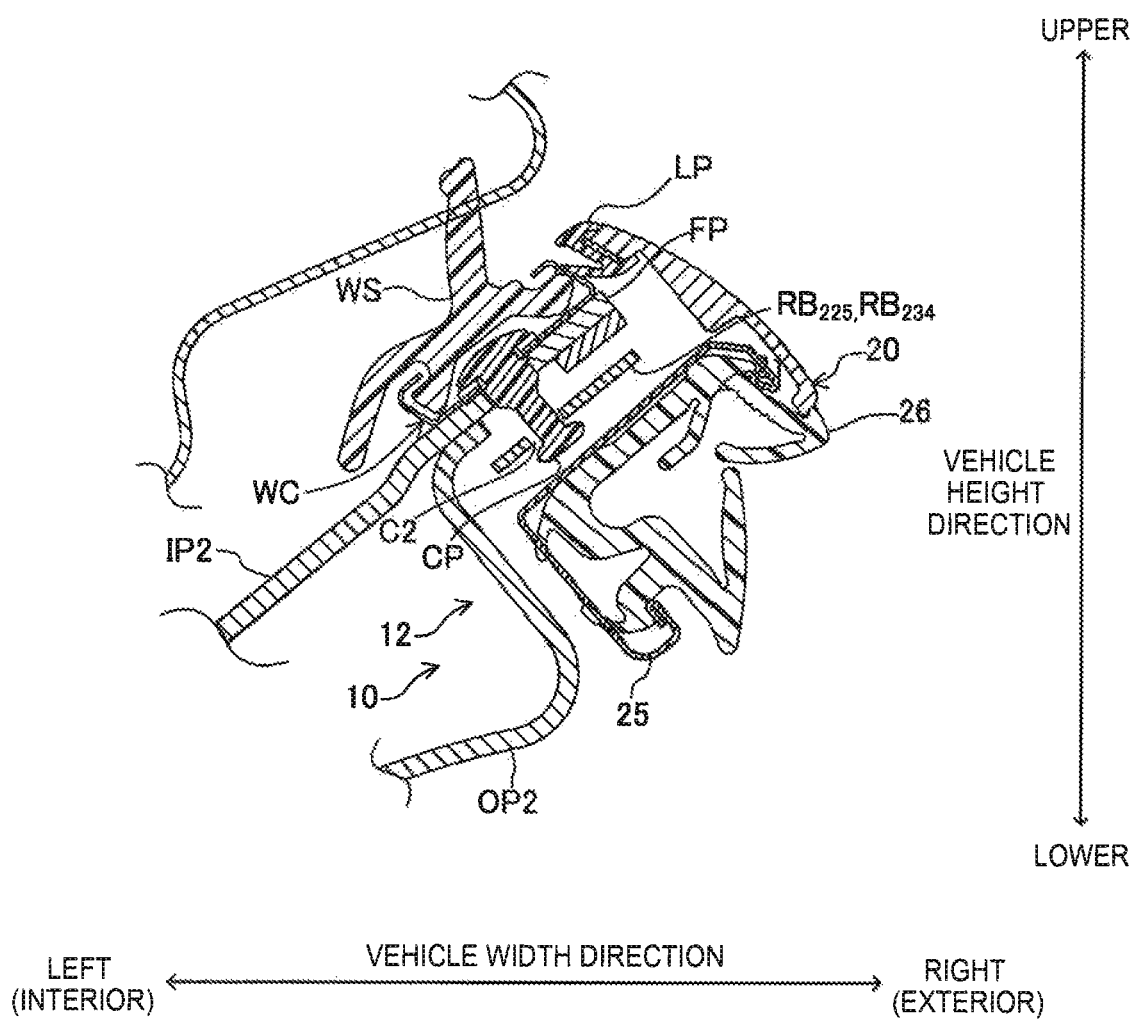
FIG. 17 is a sectional view of a section perpendicular to a longitudinal direction of the doorframe molding and an upper edge part according to the another modification, the view showing a section including a center axis of a shaft part of a clip.
Figure 18:
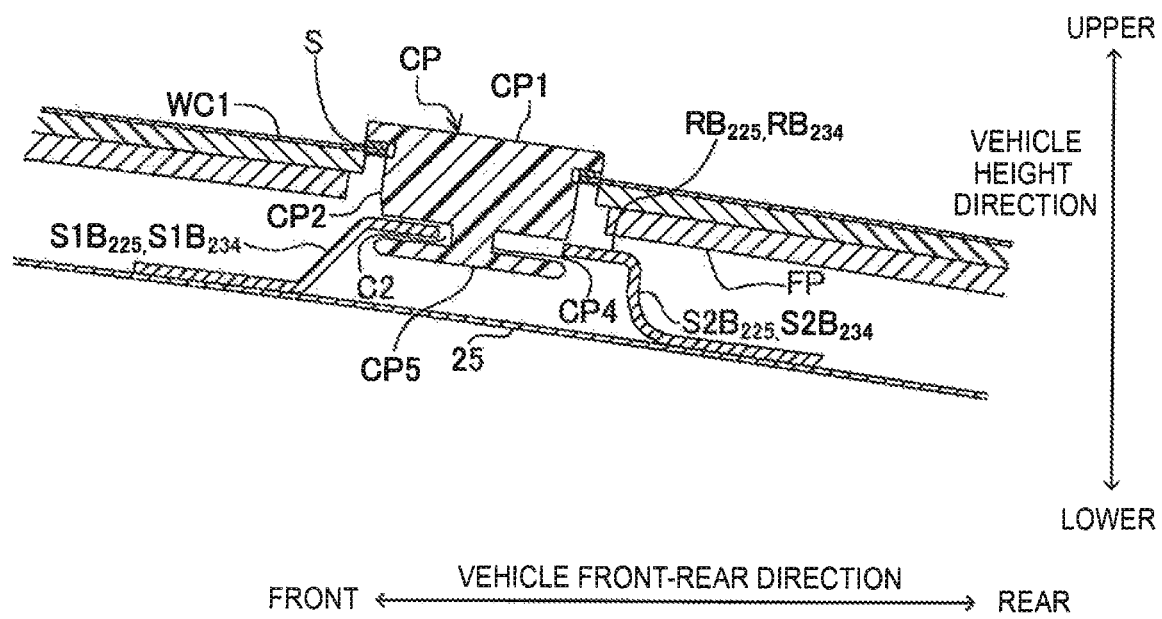
FIG. 18 is a sectional view of a section along the longitudinal direction of the doorframe molding and the upper edge part according to the another modification, the view showing a section including the center axis of the shaft part of the clip.

Also, for example, as shown in FIG. 15 to FIG. 17, the cut-out part C of the bottom raising part 225 may be made of a cut-out part C1 and a cut-out part C2. This means that the cut-out part C1 is a portion made in the upper bottom part $RB_{225}$ from its left end into the right side, and the cut-out part C2 is a portion made by cutting out the upper bottom part $RB_{225}$ from a right end part of the cut-out part C1 into the front side. In this case, it is preferred that a dimension of the cut-out part C of the bottom raising part 234 in the vehicle front-rear direction is set to be larger than that in the example shown in FIG. 7. In that case, the doorframe molding 20 is moved from the right side of the doorframe 10 to the left to insert the shaft part CP4 of the clip CP into the cut-out part C1. Then, the doorframe molding 20 is moved to the rear to insert the shaft part CP4 of the clip CP into the cut-out part C2. Thus, in the bottom raising part 225, the peripheral parts of the cut-out part C1 and the cut-out part C2 are engaged with the rib part CP5, and, in the bottom raising part 234, the peripheral part of the cut-out part C is engaged with the rib part CP5. Contrary to the example shown in FIG. 15 to FIG. 17, the cut-out part C2 may be made from a right end part of the cut-out part C1 into the rear side. In this case, after the shaft part CP4 of the clip CP is inserted into the cut-out part C1, the doorframe molding 20 is moved to the front, so that the shaft part CP4 of the clip CP is inserted into the cut-out part C2. In a state where the doorframe molding 20 described as above is temporarily fixed to the doorframe 10, even when the doorframe molding 20 is pulled towards the exterior side, the shaft part CP4 abuts on a left end surface of the cut-out part C2. Thus, the doorframe molding 20 is restrained from falling from the doorframe 10.

What is claimed is:

1. A mounting structure for a doorframe molding, comprising:
   an upper edge part that defines an upper side of a window frame of a door of a vehicle, the door having an interior side and an exterior side;
   an engaging part that includes a shaft part projecting generally downwardly from the upper edge part and a rib part extending from a lower end of the shaft part in a vehicle front-rear direction or a vehicle width direction;
   a body part of the doorframe molding extending along an inner peripheral part of the upper side of the window frame; and
   a bracket that is mounted on a surface of the body part, projects from the body part, and is engaged with the engaging part, wherein
   the bracket has a cut-out part that is made by cutting out an upper bottom part of the bracket,
   the shaft part is inserted into the cut-out part in a first direction parallel with a surface of the upper bottom part, and the rib part engages the surface of the upper bottom part adjacent a peripheral part of the cut-out part,
   when the rib part is engaged with the surface of the upper bottom part and the shaft part is inserted into the cut-out part, the shaft part is removed from the cut-out part by moving the shaft part in a second direction opposite the first direction,
   the rib part is configured to be engaged with, and disengaged from, the surface of the upper bottom part adjacent the peripheral part of the cut-out part,
   the mounting structure further comprises a groove-shaped member, to which a weather strip for sealing a gap between the upper edge part and a periphery of a doorway of the vehicle is mounted,
   the engaging part further includes a top plate part for fixing the groove-shaped member to the upper edge part, and
   the groove-shaped member extends along the upper edge part and opens generally upwardly.

2. The mounting structure according to claim 1, wherein the bracket includes a projecting part adjacent the cut-out part of the bracket.

3. The mounting structure according to claim 1, wherein the cut-out part comprises a first cut-out part, which is made by cutting out a first portion of the bracket and a second cut-out part, which is made by cutting out a second portion of the bracket.

* * * * *